(12) United States Patent
Soula et al.

(10) Patent No.: US 6,933,880 B2
(45) Date of Patent: Aug. 23, 2005

(54) PROGRAMMABLE SOURCE OF PULSE TRAINS ON INTERMEDIATE FREQUENCY AND IFF EMITTING ASSEMBLY USING IT

(75) Inventors: Stéphane Soula, Laval (FR); Claude Provost, Laval (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/730,487

(22) Filed: Dec. 9, 2003

(65) Prior Publication Data

US 2004/0160356 A1 Aug. 19, 2004

(30) Foreign Application Priority Data

Dec. 10, 2002  (FR) ............................................ 02 15597

(51) Int. Cl.$^7$ .......................... G01S 13/78; G01S 7/282
(52) U.S. Cl. ........................ 342/45; 342/175; 342/200; 342/201; 342/202; 342/204
(58) Field of Search .......................... 342/45, 175, 195, 342/200–204

(56) References Cited

U.S. PATENT DOCUMENTS

| | | | | |
|---|---|---|---|---|
| 5,712,628 A | * | 1/1998 | Phillips et al. | ........... 340/10.51 |
| 5,859,878 A | * | 1/1999 | Phillips et al. | .............. 375/316 |
| 5,867,535 A | | 2/1999 | Phillips et al. | |
| 6,072,994 A | * | 6/2000 | Phillips et al. | ................ 455/84 |

FOREIGN PATENT DOCUMENTS

| | | |
|---|---|---|
| EP | 1184679 A | 3/2002 |
| FR | 2707015 A | 12/1994 |

* cited by examiner

*Primary Examiner*—John B. Sotomayor
(74) *Attorney, Agent, or Firm*—Lowe Hauptman & Berner LLP

(57) ABSTRACT

The invention relates to a pulse-modulated source with adjustable parameters and to its use in an IFF or secondary radar emitting assembly. The architecture of currently used IFF emitting assemblies is such that there is a limit to the possible reduction in the space requirement of such equipment, and this limit is soon reached. Furthermore, the precision in terms of frequency remains coarse and the number of IFF emitting modes is very small. A programmable source of pulse trains on an intermediate frequency is disclosed. The source comprises: an input receiving an emitting command comprising the emitting mode; an instruction device connected to this emitting command input, generating emitting instructions; a formatting device transcribing the emitting instructions into at least one first control signal; a digital frequency synthesizer device receiving at least the first control signal and generating a modulated signal on an intermediate frequency; the signal being modulated according to a pulse train having characteristics that are determined by the first control signal.

20 Claims, 3 Drawing Sheets

PROGRAMMABLE SOURCE OF PULSE TRAINS ON INTERMEDIATE FREQUENCY AND IFF EMITTING ASSEMBLY USING IT

BACKGROUND OF THE INVENTION

1. Field of the Invention

The invention relates to a pulse-modulated source with adjustable parameters and to its use in an IFF or secondary radar emitting assembly.

In the field of IFF (Identification Friend or Foe) or secondary radar, different waveforms and modulations are used depending on the mode of operation of the IFF emitter as can be seen in the following table.

| IFF emitting mode | Modulation used |
| --- | --- |
| Mk X and Mk XII Interrogations & Responses | Pulse |
| Mode S Interrogations | Pulse + DPSK |
| Mode S Responses | PPM type pulses |
| Mode 5 Interrogations & Responses 5 | Pulses + MSK |

Each IFF emitting mode has an associated modulation source placed in the emitting assembly. Thus, the IFF emitting assembly comprises four different sources for each of the four IFF emitting modes indicated here above. The source consists of a voltage-controlled oscillator VCO and a phase-locked loop PLL which gives a signal directly at the output frequency. The output of the source is then modulated to obtain the desired IFF signal.

A classic IFF emitting assembly therefore comprises:
- a first source connected to two channels, each comprising an amplitude modulator to carry out the pulse modulation, the two channels corresponding to the two frequencies necessary, one for emitting and the other for testing the reception system in the Mk X and Mk XII interrogation and response modes,
- a second source connected to two channels, each comprising an amplitude modulator and a DPSK modulator carry out the phase shift keying pulse modulation, the two channels corresponding to the two frequencies necessary, one for emitting and the other for testing the reception assembly in the Mode S Interrogation mode,
- a third source connected to two channels, each comprising an amplitude modulator and an MSK modulator to carry out the minimum phase shift keying pulse modulation, the two channels corresponding to the two frequencies necessary, one for emitting and the other for testing the reception channel in the Mode 5 Interrogation and Response mode.

The drawbacks of such an IFF emitting assembly are its complexity of implementation owing to the number of frequency sources and modulators used.

2. Description of the Prior Art

The U.S. Pat. No. 5,867,535 proposes to reduce the complexity of an emitting assembly necessitating the implementation of numerous radio functions by using a DSP (digital signal processor). From the information to be sent, the DSP generates the phase and quadrature signals and sends them to an FPGA (Field Programmable Gate Array). The FPGA then controls a modulator carrying out the modulation. The modulator then produces a modulated signal on an intermediate frequency comprising the information.

This solution, applied to the IFF emitters, would always call for at least two frequency sources and modulators in order to generate the DPSK and MSK frequency hops.

This is why, the number of IFF emitting modes used by the prior art emitting assembly is often very small as compared with the number of modes (24 different modes) provided for under the framework of IFF assemblies.

IFF type equipment is integrated into assemblies that are becoming increasingly compact. However, the architecture of currently used IFF emitting assemblies is such that there is a limit to the possible reduction in the volume occupied by such equipment, and this limit is soon reached.

Furthermore, the increase in the number of sources and modulators means that the precision of the IFF emitting assemblies in frequency is coarse in relation to manufacturing costs that remain high.

The present invention mitigates these drawbacks by eliminating the requirement that the emitting assembly should have a frequency source proper to each IFF emitting mode through the use of a digital frequency synthesizer capable of generating pulse trains.

SUMMARY OF THE INVENTION

An object of the invention is a programmable source of pulse trains on an intermediate frequency comprising:
- an input receiving an emitting command comprising the emitting mode,
- an instruction device connected to this emitting command input, generating emitting instructions,
- a formatting device transcribing the emitting instructions into at least one first control signal,
- a digital frequency synthesizer device receiving at least the first control signal and generating a modulated signal on an intermediate frequency, the signal being modulated according to a pulse train having characteristics that are determined by the first control signal.

The characteristics of a pulse train comprise especially the presence or absence of frequency hops and the characteristics of these frequency hops.

An improvement is made in the invention. This improvement provides for a device comprising fewer physical links and higher precision in the characteristics of the modulated signal obtained. This improvement can be obtained when the formatting device comprises an input interface comprising connected input registers controlled by emitting instructions as a function of the emitter command received by the instruction device. This improvement can also be obtained when the digital frequency synthesizer device comprises input registers controlled by the first control signal.

Another object of the invention is an IFF emitting assembly comprising:
- the programmable source of pulse trains at intermediate frequency, comprising:
  - an input connected to a man-machine interface or an external device, generating the emitting command,
  - a formatting device generating a second control signal and a third control signal as a function of the emitting instructions,
- a translation device receiving the signal modulated by a pulse train on an intermediate frequency and the second and third control signals, and generating a signal modulated by a pulse train on the frequency given by the second control signal having an amplitude given by the third control signal.

The frequency synthesizer device of an IFF emitting assembly of this kind generates, especially, at least pulse modulated signals or DPSK pulse modulated signals or MSK pulse modulated signals or PPM pulse modulated signals.

BRIEF DESCRIPTION OF THE DRAWINGS

The characteristics and advantages of the invention shall appear more clearly from the following description, given by way of an example and from the related figures, of which.

MORE DETAILED DESCRIPTION

Figure 1:
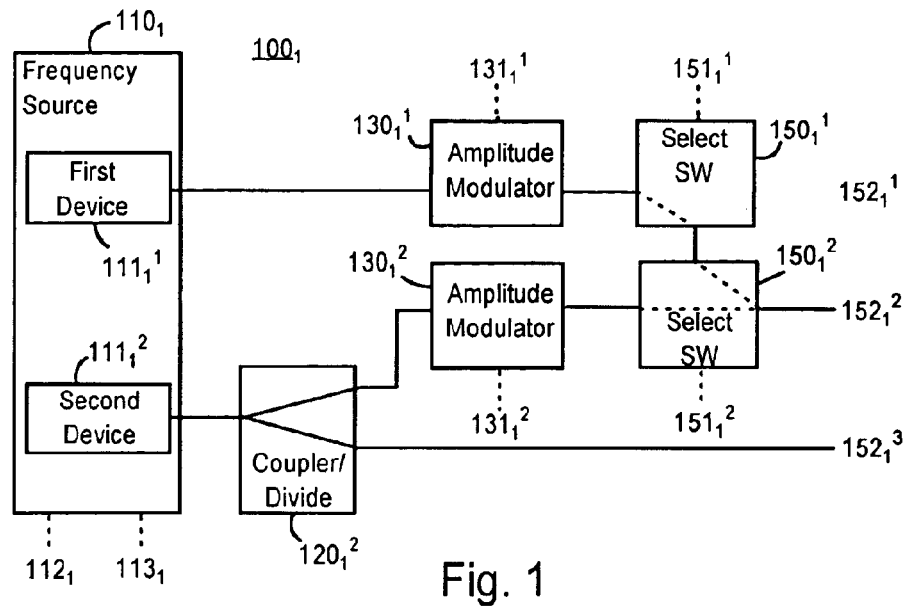
FIG. 1 is a block diagram of the of an IFF installation adapted to the Mk X and Mk XII emitting modes according to the prior art.

The block diagram of FIG. 1 shows the part $110_1$ without MSK and DPSK of a prior art emitting assembly of an IFF installation. The frequency source $110_1$ consists of a voltage-controlled oscillator VCO and a phase-locked loop PLL, such that a first device $111_1{}^1$ gives a signal at a frequency of 1090 MHz and a second device $111_1{}^2$ gives a signal at a frequency of 1030 MHz. The frequency source furthermore has two inputs $112_1$ and $113_1$ to respectively receive a resetting command for the source and a resetting command for the PLL (PLL_FAIL).

This source $110_1$ is connected to two channels corresponding to two frequencies that are necessary, one for emitting and reception (1090 MHz in the example) and the other for testing (1030 MHz in the other example) in the Mk X and Mk XII interrogation and response modes. Each of these two channels has an amplitude modulator, respectively $130_1{}^1$ and $130_1{}^2$ to carry out pulse modulation. Each modulator $130_1{}^1$, $130_1{}^2$ receives a modulation command $131_1{}^1$, $131_1{}^2$ respectively for testing or emitting.

A selector switch $150_1{}^1$ or $150_1{}^2$ controlled by a selection switch command for switching the operation of the testing assembly to emitting or its reverse $151_1{}^1$ or $151_1{}^2$ is placed at output of the modulator $130_1{}^1$ or $130_1{}^2$ on each channel. Thus, the two channels respectively give a first signal $152_1{}^1$ enabling a test and a second interrogation signal $152_1{}^2$. A coupler/divider $120_1{}^2$ is placed at output of the source $110_1$ on the emitting channel so as to be able to give a third signal $152_1{}^3$ enabling a command in reception relative to the change in operation of the emitting assembly.

Figure 2:
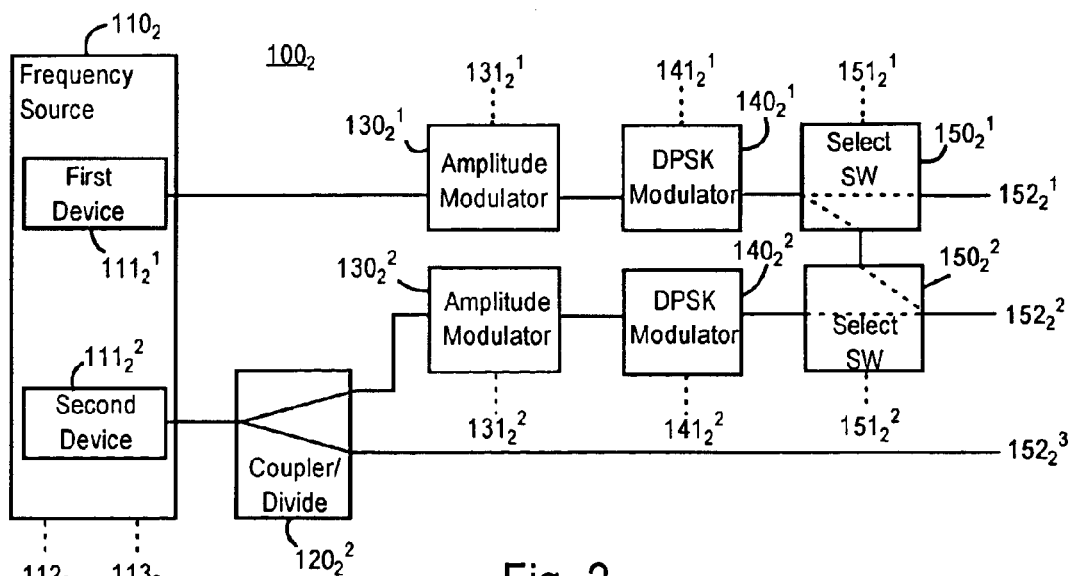
FIG. 2 is a block diagram of the part of the emitting assembly of an IFF installation adapted to the Mode S interrogation mode of emission according to the prior art.

The block diagram of FIG. 2 shows the part $110_2$ with DPSK and without MSK of a prior art emitting assembly of an IFF installation. The frequency source $110_2$ consists of a voltage-controlled oscillator VCO and a phase-locked loop PLL, such that a first device $111_2{}^1$ gives a signal at a frequency of 1090 MHz and a second device $111_2{}^2$ gives a signal at a frequency of 1030 MHz. The frequency source furthermore has two inputs $112_2$ and $113_2$ to respectively receive a resetting command for the source and a resetting command for the PLL (PLL_FAIL).

This source $110_2$ is connected to two channels corresponding to the two frequencies necessary, one for emitting and reception (1090 MHz in the example) and the other for testing (1030 MHz in the example) in the Mode S interrogation mode. Each of these two channels has an amplitude modulator, respectively $130_2{}^1$ and $130_2{}^2$ to carry out pulse modulation. Each modulator $130_2{}^1$, $130_2{}^2$ receives a modulation command $131_2{}^1$, $131_2{}^2$ respectively for testing or emitting.

Each channel furthermore has a DPSK modulator $140_2{}^1$ and $140_2{}^2$ to carry out the phase shift keying pulse modulation. The DPSK modulation is obtained by switching over phase-shifters. Each DPSK modulator $140_2{}^1$, $140_2{}^2$ receives a DPSK modulation command $141_2{}^1$, $141_2{}^2$ respectively for testing or emitting.

A selector switch $150_2{}^1$ or $150_2{}^2$ controlled by a selection switch command for switching the operation of the testing assembly to emitting or its reverse $151_2{}^1$ or $151_2{}^2$ is placed at output of the modulator $130_2{}^1$ or $130_2{}^2$ on each channel. Thus, the two channels respectively give a first signal $152_2{}^1$ enabling a test and a second interrogation signal $152_2{}^2$. A coupler/divider $120_2{}^2$ is placed at output of the source $110_1$ on the emitting channel so as to be able to give a third signal $152_2{}^3$ enabling a command in reception relative to the change in operation of the emitting assembly.

A classic IFF emitting assembly therefore comprises:

A first part as shown in FIG. 1 for the Mk X and Mk XII Interrogation and Response Mode, A second part as shown in FIG. 2 for the Mode S Interrogation Mode, A third part (not shown) for the Mode 5 Interrogation and Response Mode. It also has a source constituting a third frequency reference, connected to two channels, each comprising an amplitude modulator and an MSK modulator for achieving minimum phase shift pulse modulation.

In prior art assemblies, a first frequency (1030 MHz for an interrogator) commonly called LO is used in emitting and in the passage into the intermediate frequency IF for reception; another frequency (1090 MHz for an interrogator) is used to generate the test.

The invention uses a single modulated intermediate frequency source $100*_D$ independent of the amplification assembly $170_A$, the physical parameters (frequency phrase and amplitude) of the modulated intermediate frequency signal $m_{FI}$ being totally controlled by a digital system $150_D$ by means of a first control signal $c_1$. There is thus a single device $100*$ shown in FIG. 3 carrying out all the modulations implemented in the IFF domain.

Since the amplification assembly $170_A$ then receives an already modulated intermediate frequency signal FI at the desired frequency $m_{FI}$, all it has to do is to carry out a frequency and power transposition as a function respectively of the second and third control signals $c_2$ and $c_3$. Since these transpositions are always the same, whatever the type of IFF signal to be implemented, the design of the emitting assembly is thus greatly simplified.

According to the invention, the different modulations are made in a simpler way. To this end, the general architecture of the emitting assembly (frequency source $110_1$, $110_2$+ modulator is 13011, 13012, 13021, 13022, 14021, $140_2{}^2$) as shown in FIGS. 1 and 2 is replaced by a programmable source $100*_D$ in order to generate a modulated intermediate frequency signal $m_{FI}$. The programmable source of intermediate frequency pulse trains comprises a digital interface $150_D$ and a frequency synthesizer $150_D$, for example a COTS direct digital synthesizer (DDS) illustrated in greater detail in FIG. 4a.

Thus, instead of making a multitude of signals $152_1^1$, $152_1^2$, $152_1^3$, $152_2^1$ $152_2^2$, $152_2^3$ travel between the function called the digital function $100^*_D$ and the RF part $100^*_A$, all that is transmitted henceforth is a signal modulated by the intermediate frequency $m_{FI}$ which it is sufficient to transpose (in frequency and power). This architecture therefore makes it possible to have the entire digital function $100^*_D$ available on a single card with an interface (not shown) towards the RF part $100^*_A$ placed in intermediate frequency. Thus, from a single generic core $100^*_D$ (digital interface $150_D$+COTS DDS $160_D$), it is possible to adapt several RF modules $100^*_A$ in order to meet different requirements of power (range of the equipment) or frequency (interrogator/responder).

The generation and the modulation of the intermediate frequency are done by a commercial off-the-shelf DDS $160_D$ receiving these commands $c_1$ from a specific digital interface $150_D$ (databus, addresses, control signals and associated program). This interface $150_D$ is capable of configuring the DDS $160_D$ in frequency, power and phase, and of controlling the phase or frequency hops at the rate dictated by the IFF signals.

Thus, starting from a single component $100^*_D$, it is possible to generate the signals (frequency+power+modulation) needed for operational emitting and for the looped test.

Figure 4A:
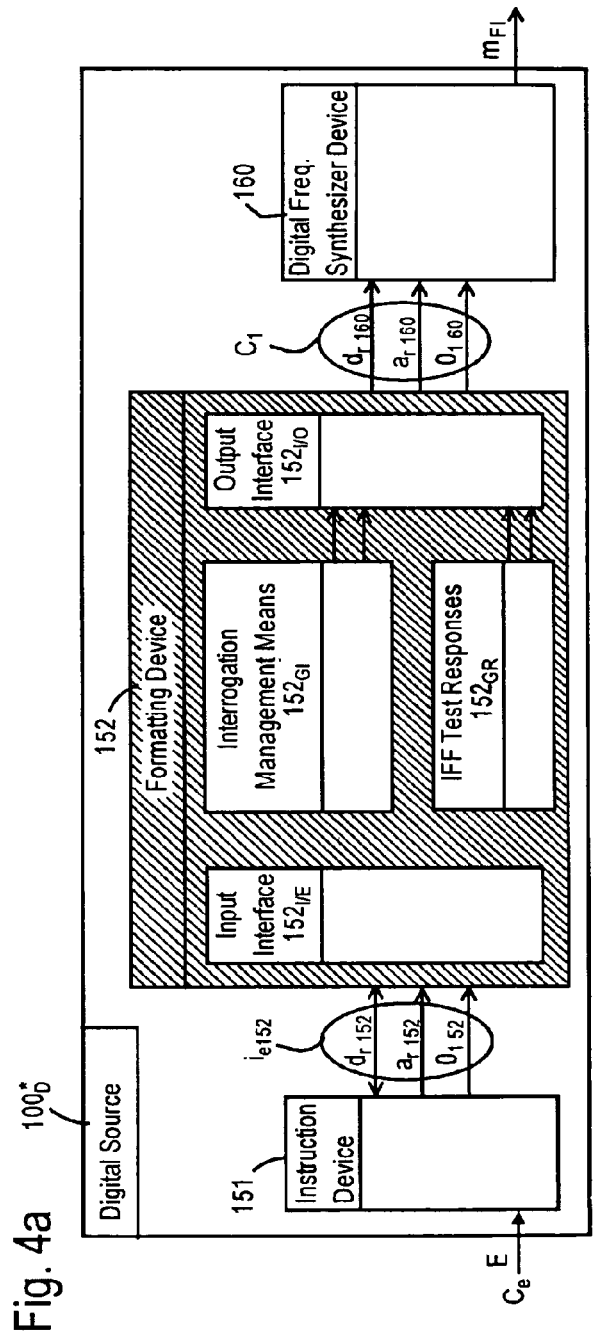
FIG. 4a is a block diagram of a programmable source of pulse trains at intermediate frequency according to the invention.

FIG. 4a gives a more precise view of the digital component $100^*_D$ constituting a programmable source of pulse trains on an intermediate frequency. The source $100^*_D$ has an input E receiving an emitting command $c_e$ that may or may not comprise the IFF emitting mode (Mk X and Mk XII Interrogations and Responses, Mode S Interrogations, Mode S responses, Mode 5 for example).

Figure 4B:
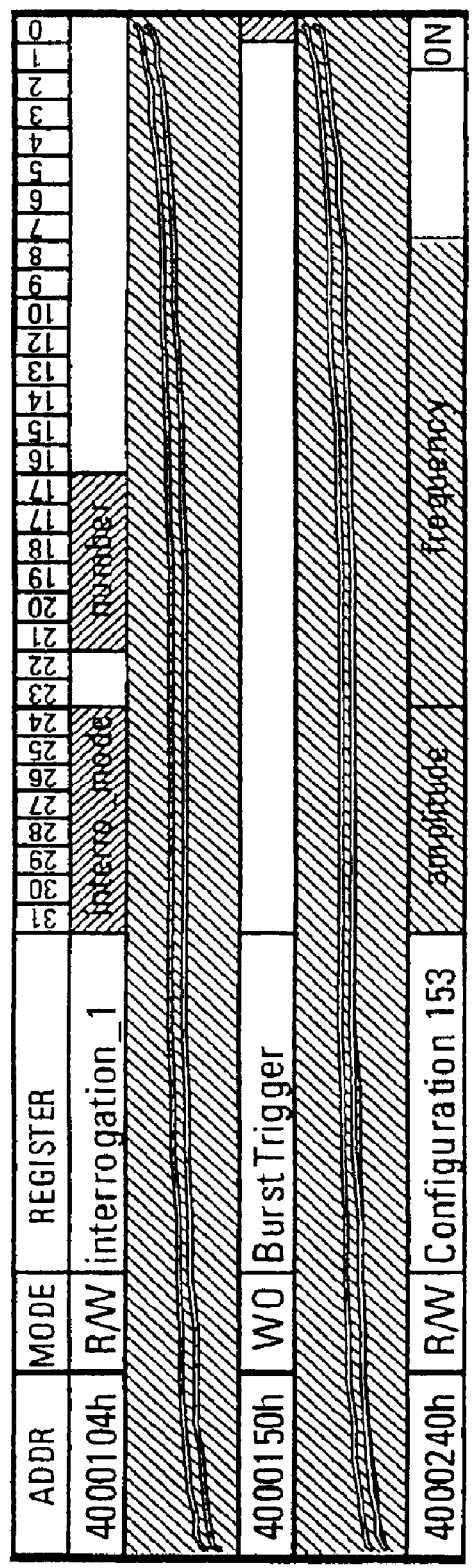
FIG. 4b shows several exemplary emitting instructions transmitted by the instruction device to the formatting device.

An instruction device 151 is connected to this emitting command input E. This instruction device 151 generates emitting instructions $i_{e152}$, that include the emitting mode. A few exemplary instructions are shown in FIG. 4b.

A formatting device 152 transcribes the emitting instructions $i_{e152}$ into at least one first control signal $c_1$. This formatting device 152 has an input interface $152_{I/E}$ comprising input registers controlled by emitting instructions $i_{e152}$. As can be seen in FIG. 4b, the emitting instructions $i_{e152}$ comprise the address of the register $a_{r152}$ in which an operation must be conducted, the type of operation to be performed, (reading, writing) $o_{152}$, the value to be written in the register written during a write operation $d_{r152}$. For example, the mode of interrogation_1 will correspond to an emitting instruction $i_{e152}$ for the reading/writing, at the address 4000104h, of the "interro_mode" values in the registers 24 to 31 of this address and "number" values in the registers 16 to 21.

For example, the instruction device 151 may be a microcontroller executing an applications-specific program parametrized by the emitting command $c_e$, received for example through a link of the HDLC (High Level Data Link Control) type.

The instruction device 151 may be connected to the formatting device 152 by only one bus (not shown).

The formatting device 152 comprises IFF interrogation management means $152_{GI}$. If the IFF emitting assembly performs reception tests, the formatting device may also comprises means for the management and generation of the IFF test responses $152_{GR}$.

Furthermore, the formatting device 152 comprises an output interface $152_{I/O}$ that generates at least the first control signal $c_1$ from the values of the input registers contained in the interface $152_{I/E}$.

A digital frequency synthesizer device 160 receives at least the first control signal $c_1$. The digital frequency synthesizer device 160 generates a signal $m_{FI}$ modulated according to a pulse train, having characteristics that are determined by the first control signal $c_1$ on an intermediate frequency. The characteristics of a pulse train comprise the presence or absence of frequency hops and the characteristics of these frequency hops.

The digital frequency synthesizer device 160 comprises input registers (pertaining to the value to be assigned to the register $d_{r160}$, the address of the register $a_{r160}$, the operation to be performed on the register $o_{160}$). These registers are controlled by the first control signal $c_1$.

The information transmitted by means of the first control signal (on the type of emission and modulation pulses for example) is transmitted in the form of discrete signals. For this purpose, the formatting device 152, for example a field programmable gate array FPGA, carries out the sequencing of the pulse trains to be sent, from parameters stored in the form of registers (registers controlled by the instruction device 151).

The formatting device 152 may be connected to the digital frequency synthesizer device 160 by only one bus (not shown).

The frequency synthesizer device 160 generates at least pulse-modulated signals, DPSK pulse modulated signals, MSK pulse modulated signals or PPM pulse modulated signals.

Pulse modulation can be obtained by activating switches of the digital frequency synthesizer device 160 to open or close the transmission line. DPSK modulation can be obtained similarly to pulse modulation with, in addition, commands for the switches of the digital frequency synthesizer device 160 switching over line segments that represent a phase shift at the frequencies considered.

In the case of an IFF interrogator,

Either the LO output switch-over signal is at a frequency of 1160 MHz with a source giving a signal $m_{FI}$ at an intermediate frequency of 130 MHz. The wave sent $m_f$ is then at 1030 MHz for the emitting of interrogations.

Or the LO output switch-over signal is at a frequency of 1160 MHz with a source giving a signal $m_{FI}$ at an intermediate frequency of 70 MHz. The wave sent $m_f$ is then at 1090 MHz for the emitting of the looped test.

In the case of an IFF responder,

Either the LO output switch-over signal is at a frequency of 960 MHz with a source giving a signal $m_{FI}$ at an intermediate frequency of 130 MHz. The wave sent $m_f$ is then at 1090 MHz for the emitting of interrogations.

Or the LO output switch-over signal is at a frequency of 960 MHz with a source giving a signal $m_{FI}$ at an intermediate frequency of 70 MHz. The wave sent $m_f$ is then at 1030 MHz for the emitting of the looped test.

The change in frequency of the LO output switch-over signal corresponds only to a change in the multiplier factor of the phase-locked loop PLL of the frequency synthesizer 160.

Thus, the invention enables the use of non-standard LO frequencies (at 1160 MHz or 960 MHz instead of 1090 MHz and 1030 MHz) and therefore gives frequencies through which it is possible to obtain a reception intermediate frequency at 70 MHz corresponding to the standard intermediate frequencies used for consumer applications and allowing the use of lower-cost components.

Figure 3:
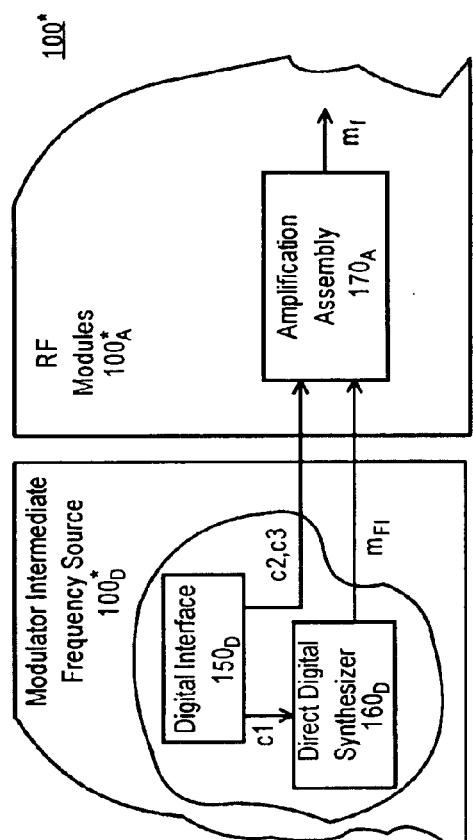
FIG. 3 is a block diagram of an IFF emitting assembly according to the invention.

The IFF emitting assembly, such as the one of FIG. 3 for example, comprises a source $100^*_D$ comprising:

an input E connected to a man/machine interface or to an external device (not shown), generating a emitting command $c_e$, a formatting device 152 generating a second control signal and a third control signal $c_2$ and $c_3$ as a function of the emitting instructions $i_{e152}$ as can be seen in FIGS. 3 and 4a.

Thus, with the translation device 170$_A$ of the IFF emitting assembly such as that of FIG. 3 for example, receiving the signal modulated by a pulse train at an intermediate frequency $m_{FI}$, the second and third control signals $c_2$ and $c_3$, generate a signal $m_f$ modulated by a pulse train on the frequency given by the second control signal $c_2$ having an amplitude given by the third control signal $c_3$.

The implementation of techniques and digital components makes it possible, through their reliability and the reproducibility of their characteristics, to reduce the time required for adjusting and setting the emitting assemblies.

What is claimed is:

1. A programmable source of pulse trains on an intermediate frequency, comprising:
   an input receiving an emitting command in an emitting mode;
   an instruction device connected to said input for generating emitting instructions;
   a formatting device transcribing the emitting instructions into a first control signal; and
   a digital frequency synthesizer device receiving the first control signal and generating a modulated signal on an intermediate frequency, the signal being modulated according to a pulse train having characteristics that are based on the first control signal.

2. The source according to claim 1, wherein the characteristics of a pulse train comprise the presence or absence of frequency hops and the characteristics of these frequency hops.

3. The source according to claim 1, wherein the formatting device comprises an input interface comprising input registers controlled by emitting instructions as a function of the emitting command received by the instruction device.

4. The source according to claim 2, wherein the formatting device comprises an input interface comprising input registers controlled by emitting instructions as a function of the emitting command received by the instruction device.

5. The source according to claim 1, wherein the emitting instructions comprise the emitting mode.

6. The source according to claim 3, wherein the emitting instructions comprise the emitting mode.

7. The source according to claim 4, wherein the emitting instructions comprise the emitting mode.

8. The source according to claim 1, wherein the formatting device comprises means for the management of the IFF interrogations and an output interface generating the first control signal from the values of the input registers.

9. The source according to claim 2, wherein the formatting device comprises means for the management of the IFF interrogations and an output interface generating the first control signal from the values of the input registers.

10. The source according to claim 3, wherein the formatting device comprises means for the management of the IFF interrogations and an output interface generating the first control signal from the values of the input registers.

11. The source according to claim 4, wherein the formatting device comprises means for the management of the IFF interrogations and an output interface generating the first control signal from the values of the input registers.

12. The source according to claim 5, wherein the formatting device comprises means for the management of the IFF interrogations and an output interface generating the first control signal from the values of the input registers.

13. The source according to claim 1, wherein the formatting device comprises means for the management of the IFF test responses and an output interface generating the first control signal from the values of the input registers.

14. The source according to claim 2, wherein the formatting device comprises means for the management of the IFF test responses and an output interface generating the first control signal from the values of the input registers.

15. The source according to claim 3, wherein the formatting device comprises means for the management of the IFF test responses and an output interface generating the first control signal from the values of the input registers.

16. The source according to claim 8, wherein the formatting device comprises means for the management of the IFF test responses and an output interface generating the first control signal from the values of the input registers.

17. The source according to claim 1, wherein the digital frequency synthesis device comprises input registers controlled by the first control signal.

18. The source according to claim 1, wherein the instruction device is connected to the formatting device by only one bus, and the formatting device is connected to the frequency synthesizer device by only one bus.

19. An IFF emitting assembly comprising:
   the source according to claim 1, comprising:
      an input connected to a man-machine interface or an external device, generating the emitting command,
      a formatting device generating a second control signal and a third control signal as a function of the emitting instructions,
   a translation device receiving the signal modulated by a pulse train on an intermediate frequency and the second and third control signals, and generating a signal modulated by a pulse train on the frequency given by the second control signal having an amplitude given by the third control signal.

20. The IFF emitting assembly according claim 19, wherein frequency synthesizer device generates at least pulse modulated signals or DPSK pulse modulated signals or MSK pulse modulated signals or PPM pulse modulated signals.

* * * * *